Dec. 9, 1969 R. M. SHIRK 3,482,946
REACTOR FOR CONTACTING VAPOROUS REACTANTS
WITH FLUIDIZED SOLIDS
Filed June 27, 1966 3 Sheets-Sheet 2
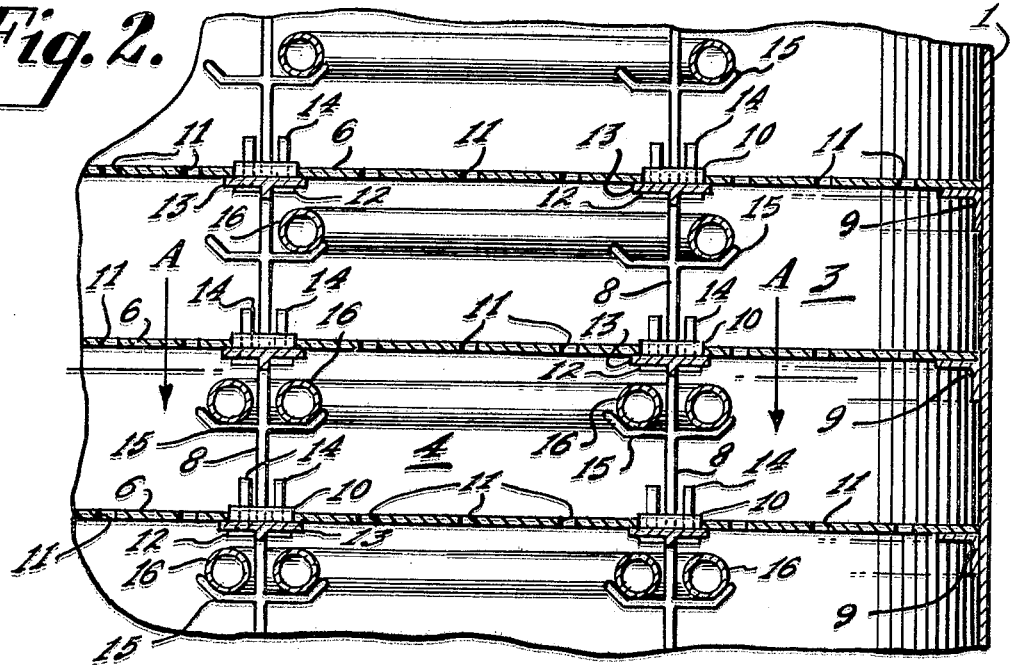
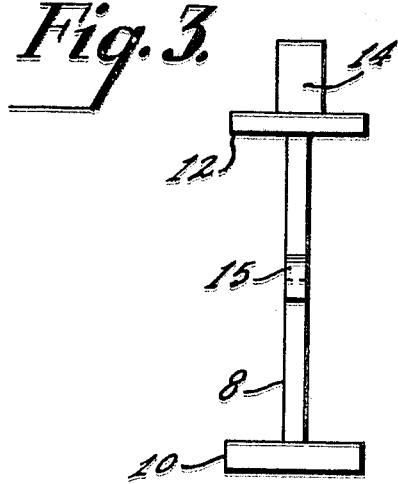
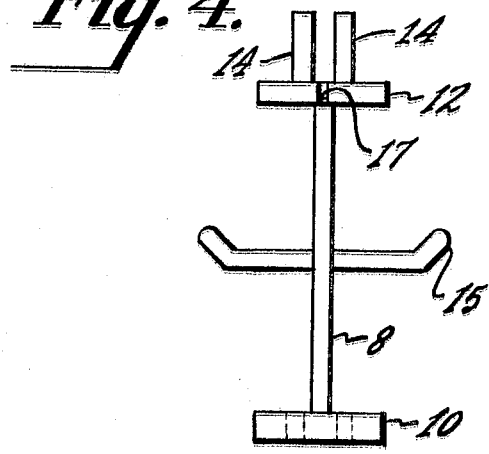
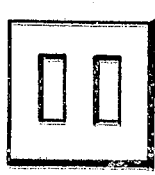
INVENTOR,
Robert M. Shirk
BY
ATTORNEY.

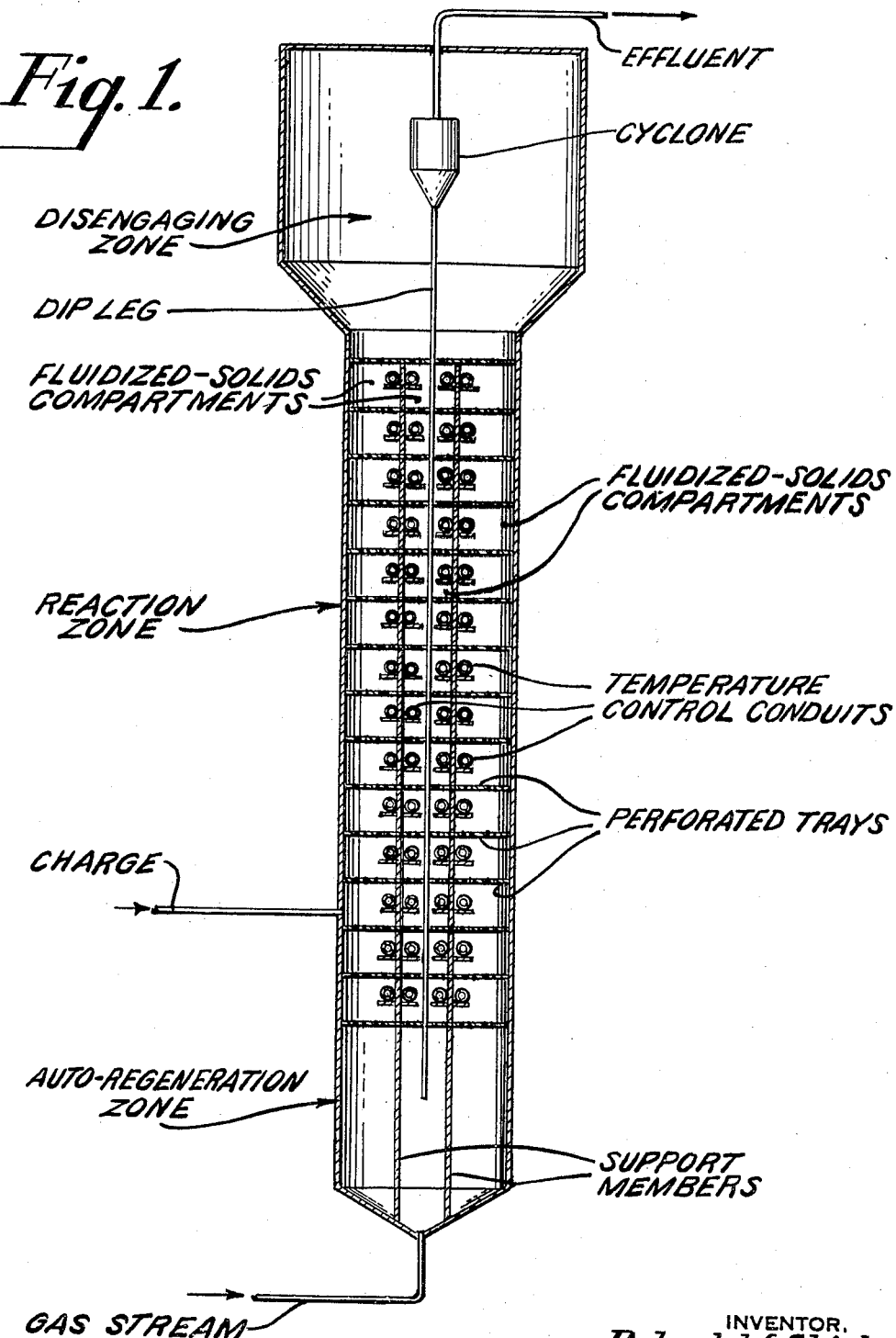

United States Patent Office 3,482,946
Patented Dec. 9, 1969

3,482,946
REACTOR FOR CONTACTING VAPOROUS REACTANTS WITH FLUIDIZED SOLIDS
Robert M. Shirk, Wilmington, Del., assignor to Air Products and Chemicals, Inc., Philadelphia, Pa., a corporation of Delaware
Filed June 27, 1966, Ser. No. 560,513
Int. Cl. B01j 9/20
U.S. Cl. 23—284                                        7 Claims

ABSTRACT OF THE DISCLOSURE

A reactor for effecting contact between vaporous reactants and finely-divided solids in which an upright, elongate reaction zone is compartmented by vertically-spaced, perforate trays removably supported by a combination of vertically-nested support members and horizontal beams supported by said support members and by the walls of the reactor. Means are provided to introduce gasiform fluids into the lower end of the reactor and to remove gasiform fluid, free of solids, from the upper end of the reactor. Temperature control means is provided within each compartment so that the mixture of vapors and fluidized solids moving freely within and between compartments may have independent temperature adjustment within each compartment.

---

Figure 6:
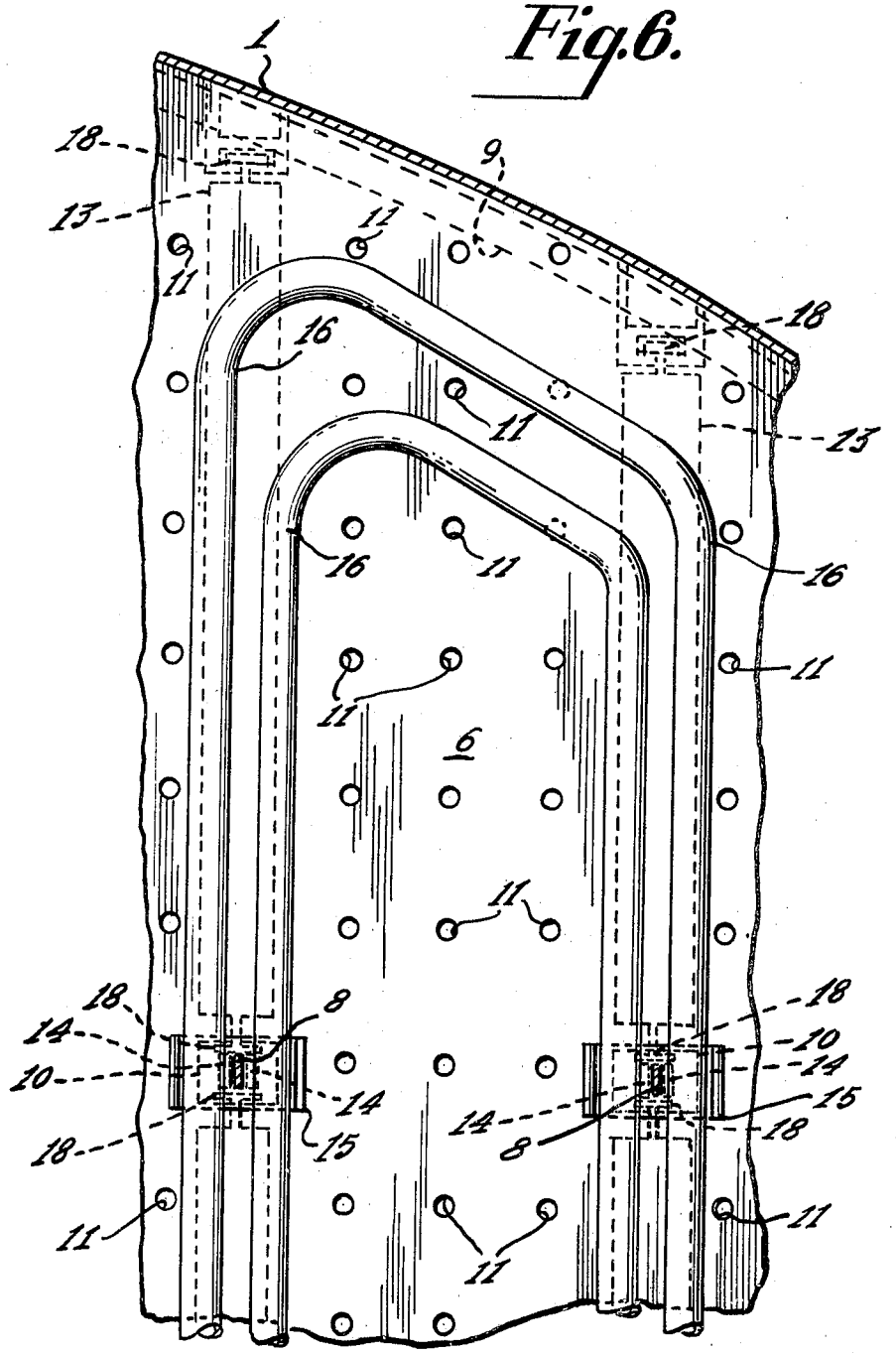

The present invention relates to apparatus for contacting fluids with solids and more particularly, to a sieve tray, fluidized-solids reactor in which improved gas-solids contact can be effected.

The use of fluidized-solids reactors for carrying out high temperature reactions has been extensive since the early 1940's. Initially, these reactors were used for the catalytic cracking of petroleum feed stocks to give high yields of gasoline. However, now fluidized-solids techniques and equipment are being employed in other fields. Generally, such reactors consist of vertical, cylindrical steel vessels containing a mass of finely divided catalytic or non-catalytic solids, with or without typical activators and promoters, suspended by a flow of vaporized feed stock. Gas velocities through these reactors may vary from the order of 0.1 to 2 feet per second or higher, based on the empty cross-section, but are sufficiently high to maintain a fluidized bed of solids having many of the characteristics of a liquid. The vaporized feed is normally introduced at or near the bottom of the reactor and may be employed as a means of introducing regenerated solids into the reactor by entrainment. Temperatures inside the reactor are usually between about 700 to 1450° F. Eventually, solids and gaseous material separate at or near the top of the reactor. A device such as a cyclone or a fritted metal filter may be employed to insure the removal of finer solids from the outgoing gas stream.

The fluidized-solids technique has found particular application in gas-solids contacting processes which require close temperature control. However, a relatively rapid circulation of solids throughout the fluidized bed must be maintained in order to have substantially uniform bed temperatures and in catalytic reactors, constant catalytic activity. Difficulties in maintaining precise temperature control as well as bypassing, forward and backward mixing and channelling problems, which are normal consequences of turbulence inside the reactor, cannot be entirely overcome by control of the solids flow. Each of these latter situations makes for poor contact with the finely divided solids—the gasiform fluid either passing through the fluidized-solids in large bubbles or substantially bypassing the solids.

It has now been discovered that these difficulties with fluidized bed reactors can be effectively eliminated by a particular compartmentalized reactor design. In accordance with the present invention, a portion of the solids-containing section of the reactor is divided into a skeletal configuration by horizontally disposed beams and vertically disposed nesting members. A plurality of perforated trays are supported by the horizontally disposed beams which are located to carry the tray load with a minimum of deflection. Temperature control coils or conduits are interdisposed, as required in the skeletal configuration of beams and nesting members. This design, which forms removable longitudinally-spaced compartments, not only permits excellent temperature control within each compartment but also permits tray spacings as close as about four inches and accessibility to the entire reactor.

The invention is further clarified by the following description read in connection with the accompanying schematic drawings. In these drawings:

FIGURE 1 is a cross-section of a fluidized-solids compartmentalized reactor,

FIGURE 2 is a fragmentary sectional view in elevation, showing fluidized-solids reactor compartments and the temperature control conduit arrangement, FIGURES 3 and 4 respectively show the side and front view of the vertical nesting support members, hereinafter described, FIGURE 5 shows the base of the vertical nesting support members illustrated in FIGURES 2 and 3, and FIGURE 6 is a fragmentary plan view, in cross-section, of the reactor taken along lines A—A of FIGURE 2.

Referring to FIGURE 1, a sieve tray, compartmentalized, fluidized bed reactor is shown. This reactor is composed of three principal zones, viz, a disengaging zone, a reaction zone and an auto-regeneration zone. A suitable fluidizing gas stream, such as air, oxygen or steam, is fed into the bottom of the reactor. The hydrocarbon charge material is introduced above the auto-regeneration zone, mixed with the rising gas stream and contacted with solids.

The reaction zone of the reactor is divided into a series of fluidized-solids compartments by perforated trays, cross beams and vertical nesting support members. Normally, the cross beams and vertical nesting support members define a skeletal or lattice work-line configuration inside the reactor. If desired, however, the vertical nesting support members could form wall sections which would divide the reactor longitudinally into separate compartments which, in turn are subdivided by the horizontal perforated trays. The holes in the perforated trays occupy between 15 and 65% of the free cross-sectional area, but are of such a size (e.g., ⅛ to ⅜ inches in diameter) to permit catalyst to continuously flow into and out of a given compartment from above and below. If desired, the perforated trays may have larger openings at lower levels in the reactor than at higher levels. Gas flow through the reactor is effectively unidirectional from compartment to compartment vertically upward through the reactor. Division of the reactor into a multiplicity of fluidized-solids compartments permits efficient contacting of gas and solids and effectively reduces by-passing, forward and backward mixing and channelling problems associated with open fluid bed reactors and many tray-containing reactors.

Vapors rising from the reaction zone pass into the disengaging zone and flow out of the reactor as effluent. Solid fines which do not remain with the dense phase of the fluidized bed can be separated from the effluent vapor by any suitable means such as at least one cyclone and may be returned to the auto-regeneration zone, e.g., by means of a dip leg, to obtain effective internal solids circulation.

While the internal circulation of solids results in a degree of uniformity with respect to heat transfer, temperature control conduits present in the fluidized-solids compartments are used to maintain the reactor in the desired temperature profile and avoid hot spots. The overall internal circulation of solids provides solids turnover, i.e., the movement of the solids through sequential zones. One purpose of the auto-regeneration zone is to maintain the solids in the desired condition.

The improved gas-solids contacting efficiency of this reactor permits equal or greater conversions at higher space velocities and over long operating periods. However, ease of construction, design flexibility and essentially maintenance-free operation are equally significant attributes of this reactor.

Referring to FIGURE 2, the reactor sidewall is shown at 1. Inside the reactor, the solids-contacting section of the reaction zone is divided into a series of compartments, of which compartments 3 and 4 are representative. In these compartments perforated trays 6 are supported by nesting support members 8 (as in compartment 4) or by a nesting support member 8 and by a bracket 9 attached to the reactor side-wall (as in compartment 3). The perforated trays, which establish compartments or zones for the fluidized bed of solids (not shown), contain openings 11 which permit the flow of gas and solids from one compartment to another. Beams 13, which preferably have a T-shape cross section, interlock with nesting support members 8 (at opening 17 shown in FIGURE 4) and eventually to the side-wall of the reactor. In the vertical direction, the nesting support members rest on one another and more particularly, the base 10 (see FIGURE 5) of each nesting support member interlocks with a U-shaped structure 12 and 14 (see FIGURES 3 and 4) on the top of the nesting support member immediately below it. These nesting support members 8 contain hangers 15 which are employed to support generally at least one temperature control coil 16. The end portions of these hangers may be curved slightly, if desired, not only to cradle the coils 16 but also to provide some protection from the scouring action of the fluidized-solids in each compartment.

As seen in FIGURE 6, temperature control coils 16, which are supported by hangers 15, may follow a circuitous route in the reactor. Generally, separate temperature control coils are employed for each compartment or series of compartments on the same horizontal level. Beams 13 are affixed to nesting support members 8 as well as the side-walls of the reactor by suitable means which permit beams 13 to be readily removed, e.g., T-slot connections 18.

It will be appreciated that the present design permits spacing of the perforated trays within about a four inch minimum and a maximum distance dictated only by process requirements. The diameter of the reactor vessel is similarly dictated by process requirements. Flexibility of the design not only permits differences in compartment size but additionally allows the total number of compartments to be easily varied by step-wise addition or subtraction of perforated trays. As previously indicated, the perforated trays are supported by cross-beams which are located to carry the tray load with a minimum of deflection. Since the perforated trays, cross-beams and nesting support members are all removable, interlocking design features provide rigidity while permitting accessibility throughout the entire reactor. Of course, the nesting support members could be attached by appropriate means, such as pins inserted through the U-shaped structure located at the top of these members in a manner which would permit the entire compartmental network to be removed as a unit after the temperature control coils have been disconnected. It is also contemplated that cross-beams and nesting support members could be fabricated as one piece, i.e., as L-shaped or T-shaped members, rather than as separate pieces.

The cooling or heating conduit system of the present invention permits very precise temperature control to be maintained. Indeed, the descirbed reactor design permits an operator to maintain the same or different temperatures throughout the reactor irrespective of the degree of reaction occurring in any particular level of the reactor vessel or the rate of fluid flow. Depending on the ultimate use of the reactor, from zero to two or more temperature control conduits may be required in any single compartment. Using either manual or automatic control, these temperature control conduits can be cut in or out as required. When more than one coil or conduit is present in a compartment, the flow of fluid through the coils may be in the same or different directions. In the latter instance, a continuous circulation system may be employed wherein one coil serves for the return of fluid. Water or any other suitable temperature control media may be employed in the coils. Size of the coils is not particularly critical but will depend on the required temperature control and space limitations imposed by tray spacing.

The nature of the materials employed for the perforated trays, supporting members, coils, etc., is not critical provided, of course, that such materials do not contain elements detrimental to the overall reaction and such materials are capable of withstanding environmental conditions inside the reactor vessel. Generally, such conditions include temperatures of 700 to 1450° F. and the scouring action of fluidized-solids. In addition, the atmosphere may be oxidizing, reducing or periodically one and then the other. In view of such operating conditions, it is normally impossible to maintain protective coatings on structural materials.

While the present invention may be utilized for essentially any hydrocarbon conversion reaction in which conventional fluidized-solids reactors have been suggested or employed, the reactor design of this invention finds particular application to oxidative-dehydrogenation processes for the conversion of such materials as, butenes to butadiene. In the oxidative-dehydrogenation of butene, the catalytic conversion to butadiene is not the only reaction which takes place. Both the starting material and the desired product are subject to degradation into carbon monoxide, carbon dioxide and water. Therefore, it is essential that the desired butadiene product be formed quickly and efficiently. Thus, both effective fluid-solids contact and temperature control are required.

The present reactor design provides an excellent means of maintaining the desired operating temperature within about 3 Fahrenheit degrees and at most 5 Fahrenheit degrees—assuring the removal of the exothermic heat of reaction of oxidative dehydrogenation processes and maintaining a near isothermal reactor temperature profile. For such a system, the holes in the perforated sieve tray are ¼ inch in diameter and occupy approximately 30% of the free cross-sectional area. The gas flow is effectively unidirectional from compartment to compartment up through the reaction vessel. However, the holes in the perforated trays are of such a size and shape that catalyst for the system is permitted to continuously flow into and out of a given compartment from above and below. Catalyst returned to the auto-regeneration zone from the gas-solids disengaging zone, e.g., by means of a dip leg, represents only a small fraction of the internal circulation. Using compartments in the reactor excellent contacting of gas with the catalyst required for oxidative dehydrogenation processes is achieved.

Obviously, many modifications and variations of the invention as hereinbefore set forth may be made without departing from the spirit and scope thereof, and therefore, only such limitations should be imposed as are indicated in the appended claims.

What is claimed is:

1. A reactor for contacting vaporous reactants with fluidized solids comprising an upright elongate vessel adapted to contain a fluidized body of finely-divided solids; a plurality of removable perforate trays extending horizontally across the vessel at spaced locations along the major intermediate portion of its length, the tray perforations being sized to permit free movement of the fluidized solids throughout the vessel; vertically disposed nesting members arranged in columns supported from the lower portion of the vessel and extending upwardly through openings provided in the trays to the level of the uppermost tray; horizontally disposed beams having their ends in cooperative engagement with said nesting members and with the side walls of said vessel to support said trays; temperature control conduit means located within the compartments formed between adjacent trays; means for introducing gasiform fluids into the lower end of said vessel; and means for withdrawing gasiform effluent from the upper end of said vessel.

2. Apparatus as defined in claim 1 which is adapted for serial unidirectional flow of gasiform fluids upwardly through said compartments, with the suspended solids forming a fluidized bed of solids filling each compartment and surrounding said temperature control conduit.

3. Apparatus as defined in claim 1 wherein the temperature control conduit means are at least partially supported by the vertically disposed nesting members.

4. Apparatus as defined in claim 1 wherein the perforations in each perforated tray are from 15 to 60 percent of the total tray area and wherein the perforations are from ⅛ to ⅜ inch in diameter.

5. Apparatus as defined in claim 4 wherein perforated trays have larger openings at lower levels in the chamber than at the higher levels.

6. Apparatus as defined in claim 1 wherein the vertically disposed nesting members interlock with one another by means of U-shaped prong appendages on one end of each nesting member.

7. Apparatus as defined in claim 6 wherein the vertically disposed nesting members contain at least one armlike branch for the support of the temperature control conduit means.

References Cited

UNITED STATES PATENTS 2,438,467  3/1948  Tyson et al.

JAMES H. TAYMAN, JR., Primary Examiner

U.S. Cl. X.R.

23—288; 122—510; 165—162, 67; 248—68